US011358031B2

(12) United States Patent
Dickenson et al.

(10) Patent No.: US 11,358,031 B2
(45) Date of Patent: Jun. 14, 2022

(54) SAFETY DEVICE FOR ASSISTING A USER TO TRAVERSE A STRUCTURE

(71) Applicant: International Business Machines Corporation, Armonk, NY (US)

(72) Inventors: Marc Dickenson, Austin, TX (US); Igor S. Ramos, Round Rock, TX (US); Andrew J. Lavery, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 16/423,300

(22) Filed: May 28, 2019

(65) Prior Publication Data
US 2020/0376343 A1 Dec. 3, 2020

(51) Int. Cl.
*A63B 29/02* (2006.01)
*G05D 1/10* (2006.01)
(Continued)

(52) U.S. Cl.
CPC .......... *A63B 29/02* (2013.01); *A62B 35/0043* (2013.01); *A63B 24/0062* (2013.01);
(Continued)

(58) Field of Classification Search
CPC . A63B 29/02; A63B 24/0062; A63B 71/0054; A63B 2220/05; A63B 2220/805;
(Continued)

(56) References Cited

U.S. PATENT DOCUMENTS

| 4,253,218 A * | 3/1981 | Gibbs | F16G 11/106 188/65.1 |
| 4,941,548 A * | 7/1990 | Blanchard | A62B 1/10 188/65.1 |

(Continued)

FOREIGN PATENT DOCUMENTS

| CN | 106979773 A | * 7/2017 | ............... B64B 1/40 |
| CN | 109173113 A | 1/2019 | |

(Continued)

OTHER PUBLICATIONS

Climbing the world's tallest Radio Tower, by Fiction Park, Youtube [video online], published on Sep. 4, 2013, [retrieved an May 28, 2019], retrieved from the Internet at https://www.youtube.com/watch?v=INbKYq0G9nU.

*Primary Examiner* — Sundhara M Ganesan
(74) *Attorney, Agent, or Firm* — Edell, Shapiro & Finnan, LLC

(57) ABSTRACT

A system assists a user to traverse a structure. A safety device includes a sensor assembly to detect positions of a user along a travel path for a structure, wherein the travel path includes a plurality of attachment points to secure the user to the structure via one or more lines, a motion assembly to move the safety device along the travel path based on the detected positions of the user, wherein the motion assembly maintains a threshold distance from the user, and a coupling mechanism to couple the one or more lines to one or more of the attachment points encountered along the travel path. Embodiments of the present invention (Continued)

further include a method and program product for assisting a user to traverse a structure in substantially the same manner described above.

20 Claims, 9 Drawing Sheets

(51) Int. Cl.
*B64C 39/02* (2006.01)
*A63B 24/00* (2006.01)
*A63B 71/00* (2006.01)
*G06T 7/20* (2017.01)
*A62B 35/00* (2006.01)
*G05D 1/00* (2006.01)

(52) U.S. Cl.
CPC ........ *A63B 71/0054* (2013.01); *B64C 39/024* (2013.01); *G05D 1/0094* (2013.01); *G05D 1/101* (2013.01); *G06T 7/20* (2013.01); *A63B 2220/05* (2013.01); *A63B 2220/805* (2013.01); *A63B 2220/807* (2013.01); *A63B 2220/808* (2013.01); *A63B 2220/833* (2013.01); *B64C 2201/028* (2013.01); *B64C 2201/12* (2013.01); *G06T 2207/30196* (2013.01)

(58) Field of Classification Search
CPC ........ A63B 2220/807; A63B 2220/808; A63B 2220/833; A63B 69/0048; A63B 71/023; A63B 71/0622; A63B 2024/0025; A63B 2220/12; A63B 2225/093; A63B 2225/50; A62B 35/0043; A62B 35/0075; B64C 39/024; B64C 2201/028; B64C 2201/12; G05D 1/0094; G05D 1/101; G06T 7/20; G06T 2207/30196
See application file for complete search history.

(56) References Cited

U.S. PATENT DOCUMENTS

| 5,860,493 | A | * | 1/1999 | Cherpitel | A62B 1/14 188/65.1 |
|---|---|---|---|---|---|
| 9,944,366 | B2 | | 4/2018 | Tang | |
| 2015/0056590 | A1 | * | 2/2015 | Brost | A63B 69/0048 248/231.91 |
| 2016/0023761 | A1 | | 1/2016 | McNally | |
| 2016/0096622 | A1 | | 4/2016 | Richardson | |
| 2016/0339277 | A1 | * | 11/2016 | Angelopoulos | B66F 11/04 |
| 2016/0362180 | A1 | | 12/2016 | Priest | |
| 2017/0043268 | A1 | * | 2/2017 | Briggs | A62B 35/0087 |
| 2017/0099424 | A1 | * | 4/2017 | Jones | G06F 3/012 |
| 2018/0107169 | A1 | * | 4/2018 | Hu | A62B 35/0093 |
| 2018/0193702 | A1 | * | 7/2018 | Petrov | A62B 1/14 |
| 2018/0357879 | A1 | * | 12/2018 | Negre | G01P 15/18 |
| 2019/0099625 | A1 | * | 4/2019 | Muessig | A62B 35/04 |
| 2019/0143156 | A1 | * | 5/2019 | Weston | A62B 35/0062 104/91 |
| 2019/0314655 | A1 | * | 10/2019 | Whitty | A62B 35/0037 |
| 2019/0338593 | A1 | * | 11/2019 | Knickrehm | A62B 35/005 |
| 2019/0381359 | A1 | * | 12/2019 | Polig | G01P 15/02 |
| 2020/0054903 | A1 | * | 2/2020 | Fair | F16P 3/00 |
| 2020/0101330 | A1 | * | 4/2020 | Blackford | A62B 1/06 |
| 2020/0114182 | A1 | * | 4/2020 | Sudeith | A62B 35/0018 |
| 2020/0261753 | A1 | * | 8/2020 | Lupi | A62B 35/0043 |
| 2021/0106855 | A1 | * | 4/2021 | Al-Rasheed | A44B 11/2569 |

FOREIGN PATENT DOCUMENTS

| CN | 208319739 | U | | 1/2019 | | |
|---|---|---|---|---|---|---|
| JP | 2018127867 | A | | 8/2018 | | |
| KR | 2020018124 | A | * | 2/2020 | ........ | A62B 35/0025 |
| KR | 2172332 | B1 | * | 10/2020 | ........ | A62B 35/0037 |
| WO | 2018026285 | A1 | | 2/2018 | | |
| WO | WO-2020178549 | A1 | * | 9/2020 | ........ | A62B 35/0043 |

* cited by examiner

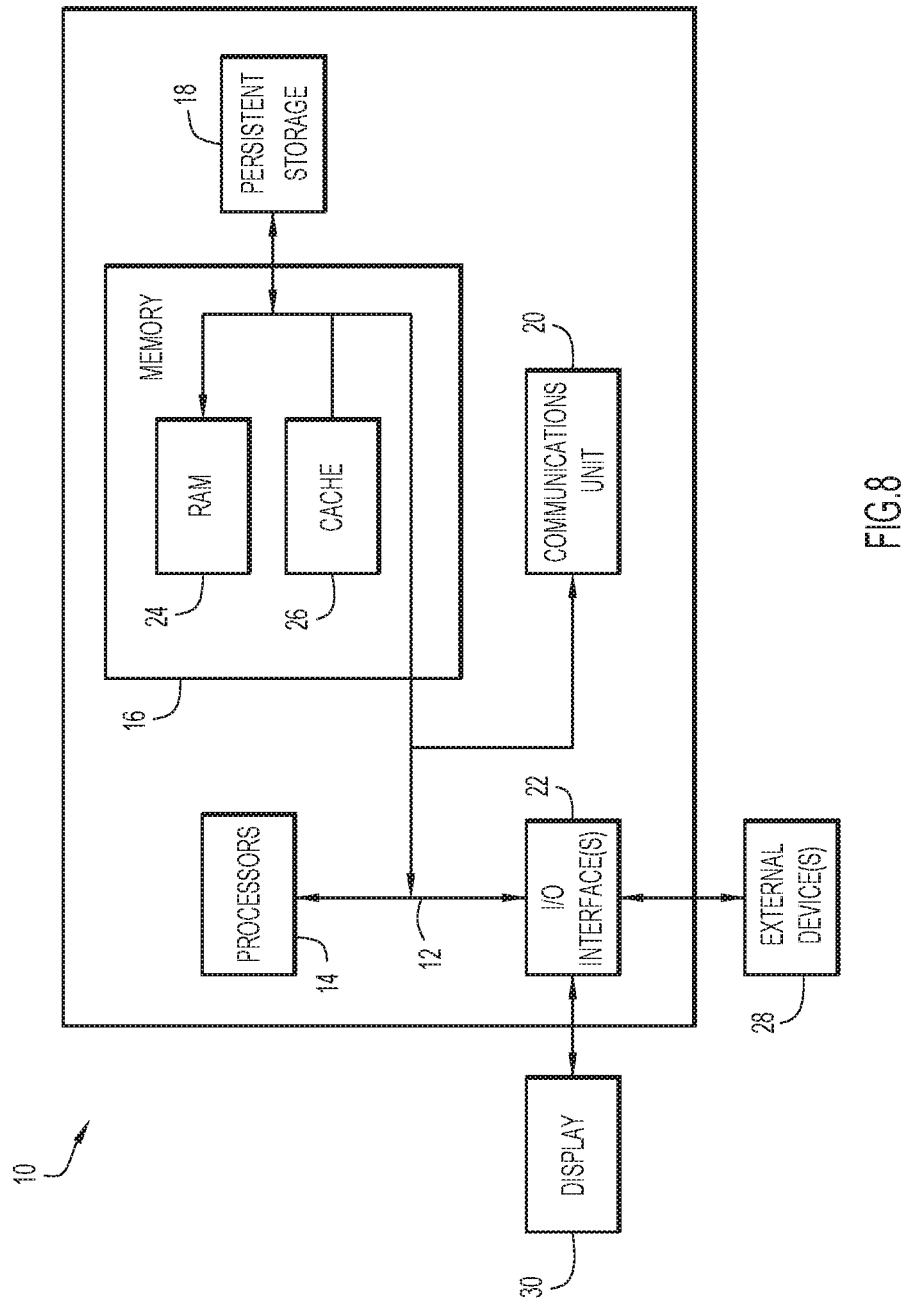

SAFETY DEVICE FOR ASSISTING A USER TO TRAVERSE A STRUCTURE

BACKGROUND

1. Technical Field

Present invention embodiments relate to climbing safety devices, and more specifically, to a safety device for providing assistance to a user who is traversing a structure.

2. Discussion of the Related Art

Climbers may refer to individuals who climb natural or man-made structures for recreation or to access remote locations. For example, an individual may climb a mountain recreationally, a technician may ascend an antenna tower to perform a repair, and the like. Climbers may use climbing equipment such as ropes and other items of climbing protection to protect against injury during falls and to assist progress. In certain occupations, such as window-washing and construction, workers may be required to employ certain climbing protections in order to comply with regulations. However, the use of climbing protections may be tiring for workers and may impede progress.

SUMMARY

According to one embodiment of the present invention, a system assists a user to traverse a structure. A safety device includes a sensor assembly to detect positions of a user along a travel path for a structure, wherein the travel path includes a plurality of attachment points to secure the user to the structure via one or more lines, a motion assembly to move the safety device along the travel path based on the detected positions of the user, wherein the motion assembly maintains a threshold distance from the user, and a coupling mechanism to couple the one or more lines to one or more of the attachment points encountered along the travel path. Embodiments of the present invention further include a method and program product for assisting a user to traverse a structure in substantially the same manner described above.

BRIEF DESCRIPTION OF THE DRAWINGS

Generally, like reference numerals in the various figures are utilized to designate like components.

FIG. 8 is a block diagram depicting a computing device in accordance with an embodiment of the present invention.

DETAILED DESCRIPTION

Figure 1A:
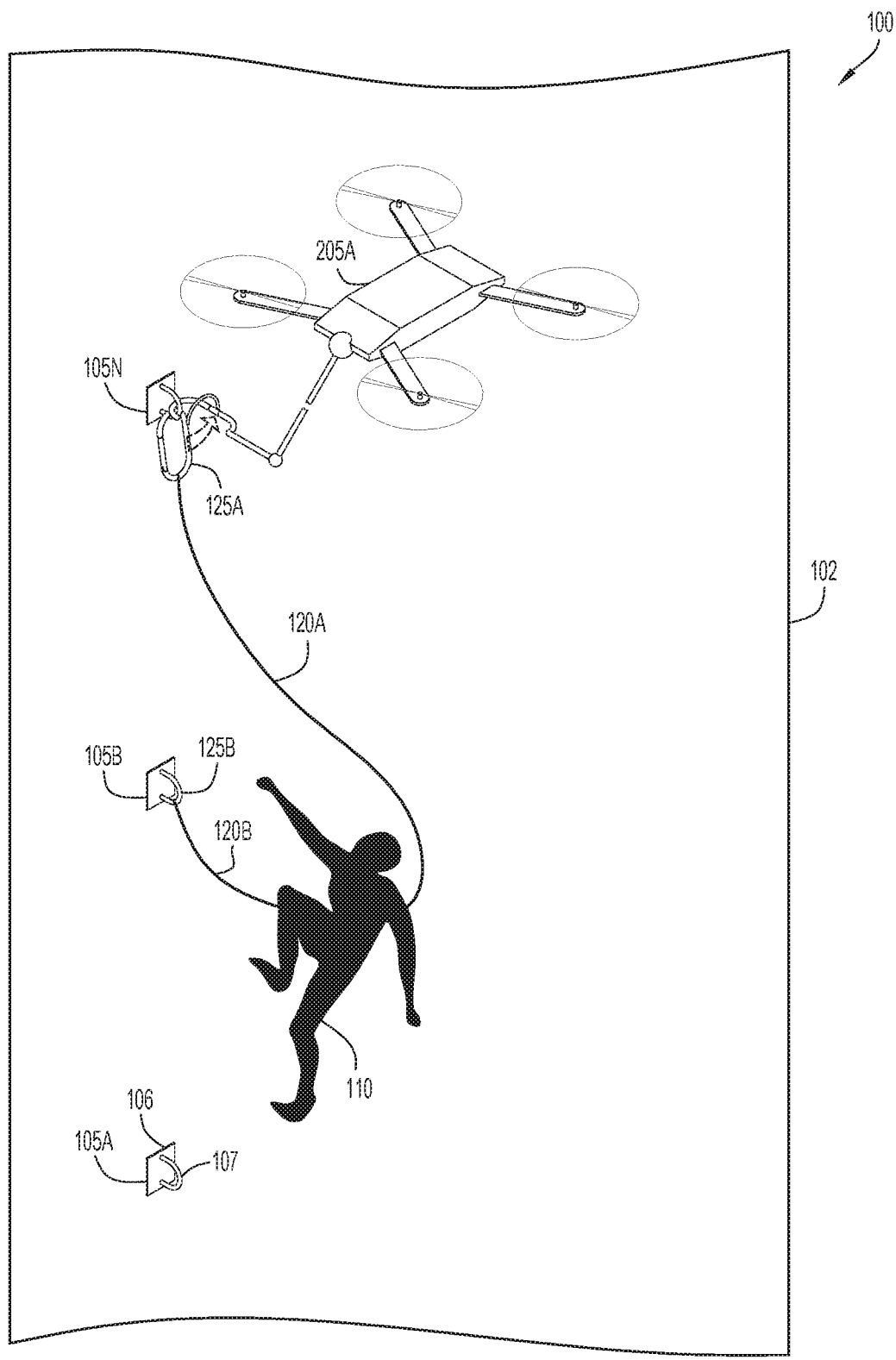
FIG. 1A is a diagram depicting an environment for providing assistance to a user traversing a structure in accordance with an embodiment of the present invention.

Present invention embodiments relate to climbing safety devices, and more specifically, to a safety device for providing assistance to a user who is traversing a structure, and more specifically, to a safety device that provides assistance to a user. Climbing may be classified into two general categories: free climbing, in which a climber uses his or her own physical strength, and aid climbing, in which gear is employed to assist a climber. Whether free climbing or aid climbing, a climber may employ one or more safety lines to catch the climber in the case of a fall. However, it may be difficult and unsafe for a climber to attach and detach safety lines during a solo climb. Moreover, attaching and detaching a safety line every few feet may impede progress and may be tiring for the climber.

Present invention embodiments employ an autonomous safety device to provide assistance to a user by tracking the user's travel path and attaching and detaching safety lines as the user progresses along the path. The safety device may manage one or more safety lines for a user by employing a mechanism to transfer lines from attachment point to attachment point along the user's travel path. The safety device may be equipped with one or more sensors to track a user's progress, and may have a motion assembly that enables the safety device to traverse the user's travel path. Since a load may not be applied to a safety line while the line is being repositioned, it may be unnecessary for the safety device to support a climber's weight, thereby enabling an autonomous aerial device to provide assistance to a user. Thus, a user may be provided with continuous support during ascent or descent of a structure in a manner that conserves a user's strength and enables a user to climb more quickly. Moreover, present invention embodiments enable a user to perform a solo climb while ensuring the user's safety.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1A is a diagram depicting an environment 100 for providing assistance to a user traversing a structure in accordance with an embodiment of the present invention. As depicted, environment 100 includes a structure 102, a plurality of attachment points 105A-105N, a user 110, lines 120A and 120B, carabiners 125A and 125 B, and a safety device 205A.

As depicted in environment 100, user 110 is traversing structure 102. Structure 102 may include any natural or man-made structure, such as an earthen structure, a building, a tower, a pole, and the like. Structure 102 may include a plurality of attachment points 105A-105N that are positioned vertically along structure 102 and may be used to support one or more safety lines. However, the attachment points may be positioned along any axis or direction of the structure. Attachment points 105A-105N may provide points of attachment for safety lines while user 110 climbs using features of structure 102, such as natural or man-made hand-holds and/or foot-holds. Each attachment point 105A-105N may be attached to structure 102 in a manner that enables the attachment points 105A-105N to support a force of a falling user. For example, when a person weighing two hundred pounds falls four feet, the person may impart a force at impact of approximately 1600 pounds, which an attachment point must be capable of bearing (or multiple attachment points must collectively bear). Thus, attachment points 105A-105N may be spaced accordingly such that a falling user 110 may only fall a minimum distance. In some embodiments, each attachment point 105A-105N may have an anchor that is screwed into structure 102. Attachment points 105A-105N may each have a plate 106 with a loop or other projection 107 secured thereto that can serve as a point of attachment for an attachment device such as a carabiner. The particular attachment device may be selected based on the surface composition of structure 102; for example, a different attachment device may be used depending on whether the structure is metal, wood, concrete, stone, etc.

As user 110 climbs, safety device 205A may autonomously follow along the travel path of user 110, detaching and subsequently re-attaching safety lines (e.g., lines 120A and 120B) as user 110 progresses along the travel path. According to an embodiment depicted in environment 100, safety device 205A is an aerial device capable of flying alongside the travel path of user 110. Safety device 205A may maintain a threshold distance from user 110 while the user ascends or descends structure 102. Safety device 205A may select a line that is positioned at a point on a travel path, detach the selected line, and re-attach the selected line to an advanced position along the travel path. Safety device 205A may attach and detach lines 120A and 120B by manipulating carabiners 125A and 125B. If a user is ascending, a detached line may be attached to an attachment point at a higher position, and if a user is descending, a detached line may be attached to an attachment point at a lower position. For example, if user 110 is descending in environment 100, safety device 205A may detach line 120A from attachment point 105N and attach line 120A to attachment point 105A; as the user progresses down structure 102, line 102B may be detached from attachment point 105B and attached to another attachment point that is below to attachment point 105A. In some embodiments, safety device 205A may first prepare structure 102 for a climb by augmenting structure 102 with attachment points 105A-105N.

Figure 1B:
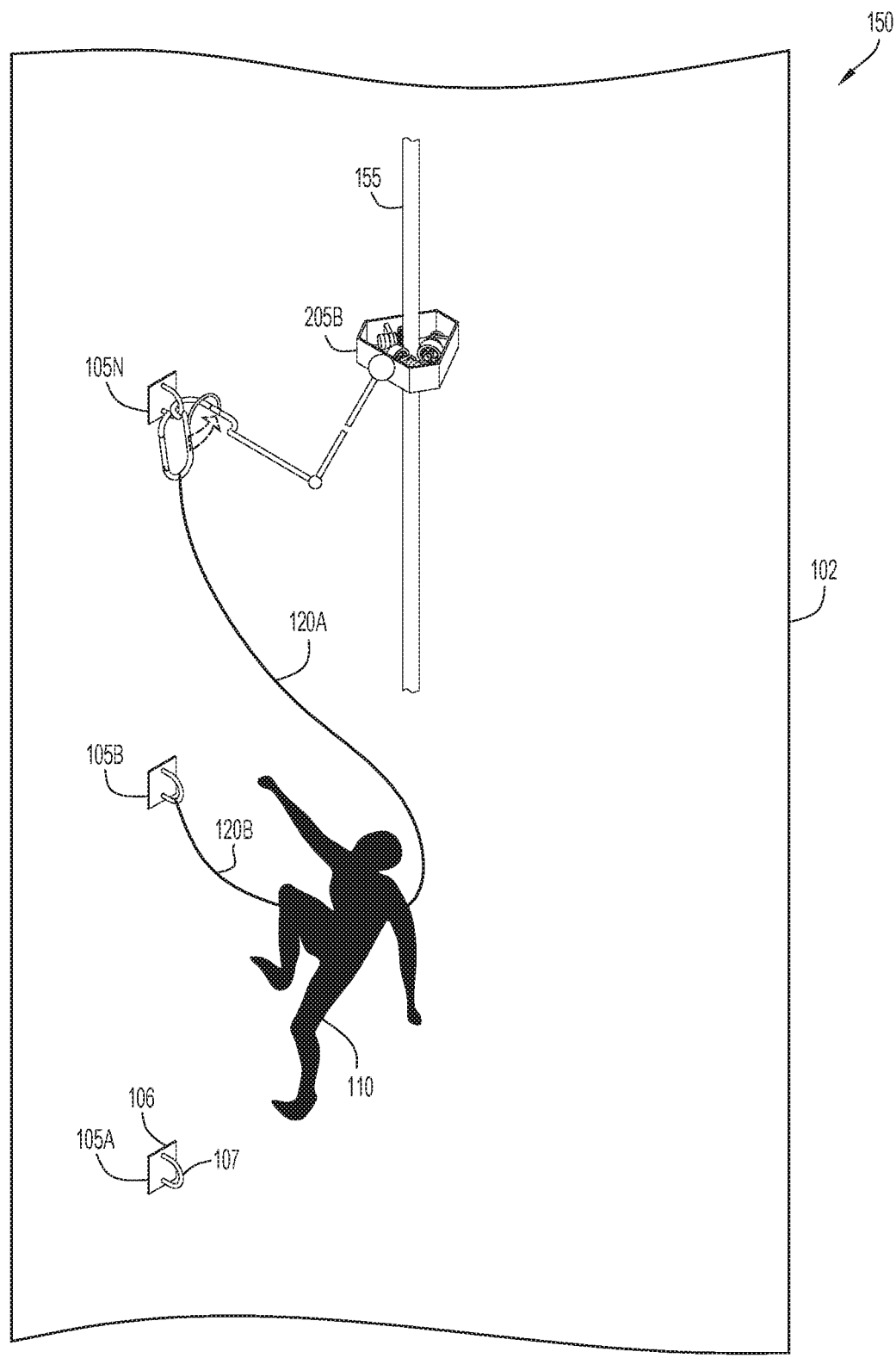
FIG. 1B is a diagram depicting an environment for providing assistance to a user traversing a structure in accordance with an alternative embodiment of the present invention.

FIG. 1B is a diagram depicting an environment 150 for providing assistance to a user traversing a structure in accordance with an embodiment of the present invention. As depicted, environment 150 includes a structure 102, a plurality of attachment points 105A-105N, a user 110, lines 120A and 120B, a safety device 205B, and a safety device support 155. Depicted in environment 150 is an embodiment of safety device 205B that changes position by moving along safety device support 155. Safety device 205B may move along safety device support 155 via an embodiment that is depicted and described in further detail with respect to FIG. 7. In some embodiments, safety device support 155 is a rigid or semi-rigid rail structure. Alternatively, safety device 205 may be supported by a tether, such as a rope or line, which may be attached to safety device 205B at one end and attached at the other end to a support point above safety device 205B. In some embodiments, safety device 205B can be raised or lowered by adjusting the length of the tether. For example, safety device support 155 may be raised or lowered by extending or retracting a tether with a winch.

Safety device 205B may maintain a threshold distance from user 110 while the user ascends or descends structure 102. Safety device 205B may select a line that is positioned at a point on a travel path, detach the selected line, and re-attach the selected line to an advanced position along the travel path. Safety device 205A may attach and detach lines 120A and 120B by manipulating carabiners 125A and 125B. If a user is ascending, a detached line may be attached to an attachment point at a higher position, and if a user is descending, a detached line may be attached to an attachment point at a lower position. For example, if user 110 is descending in environment 100, safety device 205B may detach line 120A from attachment point 105N and attach line 120A to attachment point 105A; as the user progresses down structure 102, line 102B may be detached from attachment point 105B and attached to another attachment point that is below to attachment point 105A. In some embodiments, safety device 205B may first prepare structure 102 for a climb by augmenting structure 102 with attachment points 105A-105N.

Figure 2:
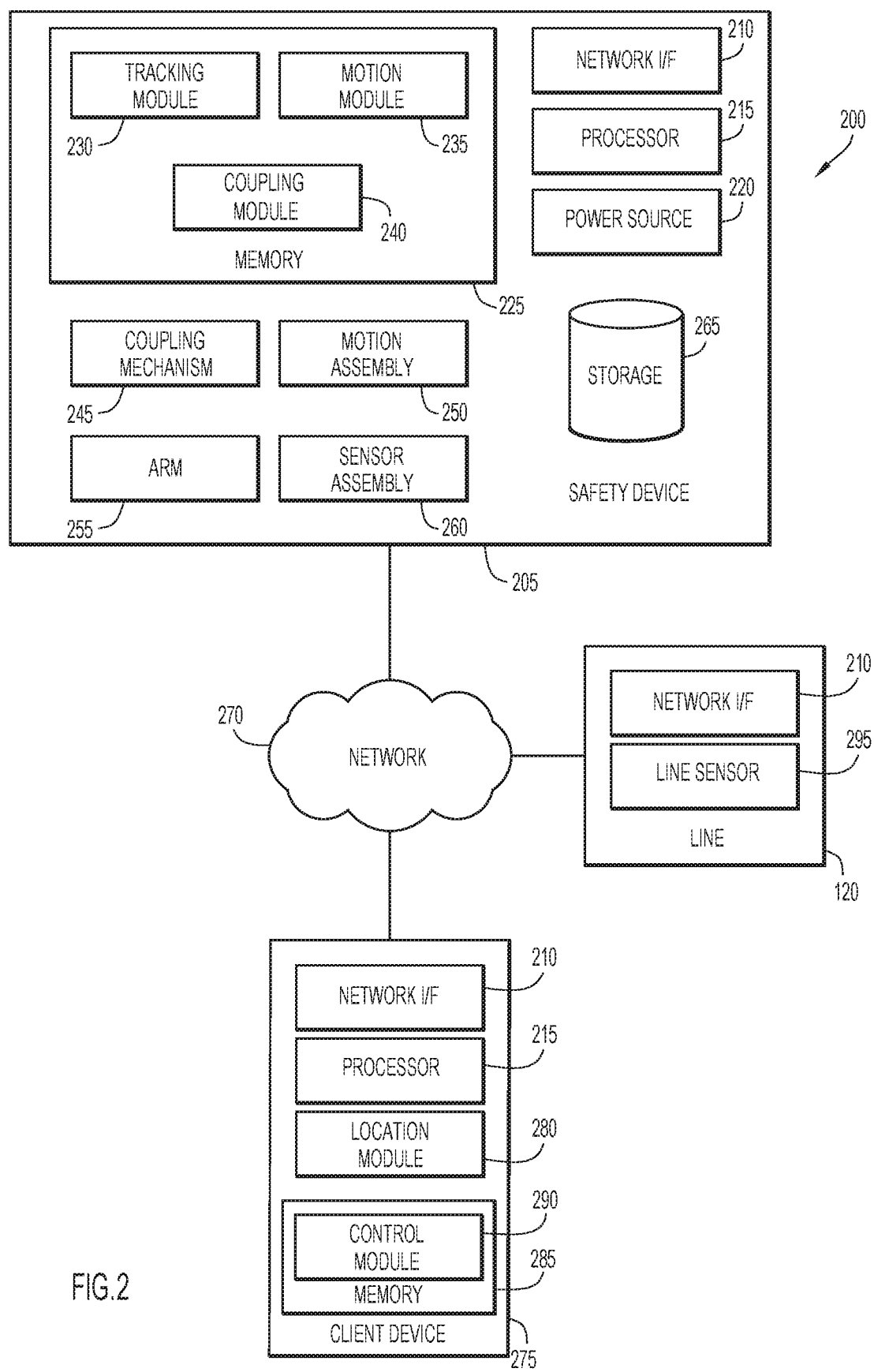
FIG. 2 is a block diagram depicting a computing environment for providing assistance to a user traversing a structure in accordance with an embodiment of the present invention.

FIG. 2 is a block diagram depicting a computing environment 200 for providing assistance to a user traversing a structure in accordance with an embodiment of the present invention. As depicted, computing environment 200 includes a safety device 205, a network 270, a client device 275, and at least one line 120. It is to be understood that the functional division among components of computing environment 200 have been chosen for purposes of explaining present invention embodiments and is not to be construed as a limiting example.

Safety device 205 includes a network interface 210, at least one processor 215, a power source 220, memory 225, a coupling mechanism 245, a motion assembly 250, an arm 255, a sensor assembly 260, and storage 265. Memory 225 includes a tracking module 230, a motion module 235, and a coupling module 240. Safety device 205 may include any autonomous device capable of providing assistance to a user in accordance with present invention embodiments.

Power source 220 may provide power to the various components of safety device 205, including network interface 210, processor 215, memory 225, coupling mechanism 245, motion assembly 250, arm 255, sensor assembly 260, and/or storage 265. Power source 220 may include an electrical battery, such as an alkaline battery or a lithium-ion battery, a wired or wireless power receiver, or any other known or other source of electrical power. Thus, power source 220 may provide safety device 205 with the power required to change position, to track a user's travel path, and to provide assistance to the user.

Tracking module 230, motion module 235, and coupling module 240 may include one or more modules or units to perform various functions of present invention embodiments described below. Tracking module 230, motion module 235, and coupling module 240 may be implemented by any combination of any quantity of software and/or hardware modules or units, and may reside within memory 225 of safety device 205 for execution by a processor, such as processor 215.

Tracking module 230 may track a user's travel path as the user climbs a structure in order to identify when safety device 205 should reconfigure the attachment of safety lines. Tracking module 230 may also determine the distance between a user and safety device 205. In some embodiments, tracking module 230 tracks a user with reference to the attachment point(s) 105A-105N to which the user is attached in order to minimize runout, the distance between a climber and his or her last piece of protection. Since a longer runout corresponds to a longer fall, runout can be managed by relocating a line that is attached to a distant attachment point to another attachment point that is farther along a user's direction of travel and/or closer to a user's current position. In some embodiments, tracking module 230 performs image processing to identify when a user is approaching known points of attachment in order to predict an optimal time for detachment and reattachment of a line. For example, tracking module 230 may perform image processing by drawing a rectangle around the user to establish a vector of direction and speed that can be used to predict when the user will reach a particular distance to/from an attachment point.

Tracking module 230 may analyze data collected via sensor assembly 260 and/or line sensor 295, including image data, audio data, strain data, pressure data, and the like, to track a user. In some embodiments, tracking module 230 may process image data from a camera of sensor assembly 260 using known or other image processing techniques to determine a user's location. Additionally or alternatively, tracking module 230 may track a user's position by processing audio data: one or more transducers of sensor assembly 260 may convert audible noises generated by a user into data that can be processed to identify the user's location. For example, tracking module 230 may analyze the difference in arrival times of sounds at various microphones of sensor assembly 260 to perform known or other acoustic location techniques.

In some embodiments, tracking module 230 tracks a user's progress along a travel path by analyzing strain and/or pressure data collected by line sensor 295 of line 120. As a user progresses farther from a particular attachment point to which a line is attached, the line may experience an increase in tension, which can be measured by monitoring strain and/or pressure. Tracking module 230 may receive data from line sensor 295 to analyze strain and/or pressure on a line, and a line may be relocated to a different attachment point when the strain and/or pressure exceeds a predetermined value. In some embodiments, tracking module 230 may receive location information from location module 280 of client device 275 in order to track a user's position.

In some embodiments, tracking module 230 may apply known or other image processing techniques to detect the progress of a user along a travel path and to estimate a risk of a fall. A user's progress may be determined by comparing the user's current position to a destination point and/or a point of origin. In some embodiments, a risk of a user falling may be estimated by analyzing a user's progress over time. For example, if a user is traversing a structure at a much slower rate than the user was previously traversing the structure, or if the user ceases to progress along the travel path, it may indicate that the user is at risk of a fall. In some embodiments, tracking module 230 may use image processing to perform a sentiment analysis to determine a user sentiment, which may be correlated to a risk of a fall. For example, if a user is stressed or panics, the user may be more likely to fall. When a user is at risk of a fall, tracking module 230 may transmit an alert to one or more devices, such as client device 275 or other devices.

Motion module 235 may provide instructions to motion assembly 260 to control the movement and position of safety device 205. Motion module 235 may instruct motion assembly 260 to position safety device 205 in a position that is some predefined distance from a user. In particular, safety device 205 may be positioned such that it is within a minimum threshold distance of a user and/or does not exceed a maximum threshold distance from a user. For example, as a user climbs structure 102, motion module 235 may ensure that safety device 205 is positioned at some location between ten and twenty feet from the user's current position (as determined via tracking module 230). Motion module 235 may also control movement of safety device 205 as line 120 is relocated from one attachment point to another attachment point.

Coupling module 240 may control coupling mechanism 245 and arm 255 to attach and detach line 120 to and from attachment points 105A-105N. Coupling module 240 may apply known or other image processing techniques in order to identify an attachment point to which line 120 is attached, manipulate arm 255 to position coupling mechanism 245 near the attachment point, and interact with the attachment mechanism (e.g., a carabiner) to release line 120. Coupling module 240 may similarly attach line 120 to a different attachment point by providing instructions to coupling mechanism 245 and arm 255. Coupling module 240 may operate in tandem with motion module 235 in order to position safety device 205 near enough to an attachment point that arm 255 and coupling mechanism 245 may reach an attachment point. In the case of multiple safety lines, coupling module 240 may leave at least one line attached at any given time, ensuring that a user is provided with continuous coverage during a climb. In the case of only one safety line, coupling module 240 may send an alert to client device 275 prior to detachment so that the user can be made aware that the user is not safeguarded against a fall until the line is reattached. The process of attaching and detaching a line is depicted and described in further detail with respect to FIGS. 4-6.

Coupling mechanism 245 may attach/detach line 120 to/from an attachment point and carry line 120 from one attachment point to another. Coupling mechanism 245 may include a side lock arm and an electromagnetic unit to couple with a carabiner that attaches line 120 to an attachment point. Coupling mechanism 245 is depicted and described in further detail with respect to FIGS. 4 and 5.

Motion assembly 250 may change the position of safety device 205. In some embodiments, safety device 205 is an aerial device that includes a rotor or other mechanism to enable flight. In other embodiments, safety device 205 attaches to safety device support 155, and may travel along safety device support 155 in order to change position. Motion assembly 250 may include a motor that is powered by power source 220. An embodiment of motion assembly 250 in which safety device 205 is attached to safety device support 155 is depicted and described in further detail with respect to FIG. 7.

Arm 255 may include one or more sections and, in the case of two or more sections, may include a joint between each section and a controller for each joint. Arm 255 may receive instructions from coupling module 240 in order to modify the positioning of the section(s). Arm 255 may connect to safety device 205 at one end, and coupling mechanism 245 may be positioned at the other end of arm 255. Arm 255 may be manipulated into a variety of configurations in order to position coupling module 240 within range of attachment points 105A-105N of structure 102.

Sensor assembly 260 may include one or more sensors, including one or more optical sensors, one or more image capture devices, one or more auditory sensors, and any combinations thereof. Sensors of sensor assembly 260 may be positioned in any location on the body of safety device 205. In particular, sensor assembly 260 may include two or more optical sensors positioned such that safety device 205 may simultaneously track a user and at least one attachment point. The auditory sensors of sensor assembly 260 may include two or more sound transducers, which may be positioned some distance from each other to enable acoustic location of a user.

Storage 265 may include any non-volatile storage media known in the art. For example, storage 265 can be implemented with a tape library, optical library, one or more independent hard disk drives, or multiple hard disk drives in a redundant array of independent disks (RAID). Similarly, data on storage 265 may conform to any suitable storage architecture known in the art, such as a file, a relational database, an object-oriented database, and/or one or more tables. Storage 265 may store data relating to a user's preferences for traversing structures, including an amount of slack in lines, preferred distance of safety device 205 from a user, information relating to a user's travel path, and the like.

Network 270 may include a local area network (LAN), a wide area network (WAN) such as the Internet, or a combination of the two, and includes wired, wireless, or fiber optic connections. In general, network 270 can be any combination of connections and protocols known in the art that will support communications between safety device 205, client device 275, and/or line 120 via their respective network interfaces 210 in accordance with embodiments of the present invention.

Client device 275 includes a network interface 210, at least one processor 215, a location module 280, and memory 285, which includes a control module 290. Client device 275 may include any mobile computing device, such as a laptop computer, a tablet computer, a netbook computer, a personal digital assistant (PDA), a smart phone, or any programmable mobile electronic device capable of executing computer readable program instructions. Network interface 210 enables components of client device 275 to send and receive data over a network, such as network 270. Client device 275 may include internal and external hardware components, as depicted and described in further detail with respect to FIG. 8.

Control module 290 may include one or more modules or units to perform various functions of present invention embodiments described below. Control module 290 may be implemented by any combination of any quantity of software and/or hardware modules or units, and may reside within memory 285 of client device 275 for execution by a processor, such as processor 215.

Control module 290 may enable a user to control aspects of safety device 205, such as a mode of operation. A user may interact with control module 290 to establish one or more modes of operation that are a combination of a user's preferences for safety device 205. One user preference may include a desired amount of slack for lines. For example, if a user wants lines to have more slack, then safety device 205 may relocate lines more frequently to ensure that the user does cause a reduction in slack by traveling too far from an attachment point to which a line is attached. A user may also indicate, via control module 290, a preference for a number of lines to be used. For example, if a user wishes to use three safety lines while traversing a structure, the user may indicate this preference to control module 290 so that safety device 205 and its modules will manage three lines. A user may also interact with control module 290 to provide a travel path, such as by indicating particular two-dimensional or three-dimensional coordinates for a travel path, selecting a destination, or selecting a predefined path.

Location module 280 may include any mechanism for determining a present location of client device 275. Location module 280 may receive one or more signals from ground-based, air-based, and/or satellite-based services in order to calculate a present position. In some embodiments, location module 280 is equipped to receive Global Positioning System (GPS) signals to determine the location of client device 275. The location of client device 275 may be described in terms of a latitude, a longitude, and/or an elevation.

Line 120 may include any safety line that can provide fall support for a free-climbing user. Line 120 may include a network interface 210 and a line sensor 295. Line sensor 295 may include a strain gauge and/or pressure gauge in order to measure strain and/or pressure experienced by line 120. Network interface 210 may transmit data collected by line sensor 295 to safety device 205 and its modules, thereby enabling safety device 205 to perform actions, such as relocating line 120, in response to an amount of tension that is applied to line 120.

Figure 3:
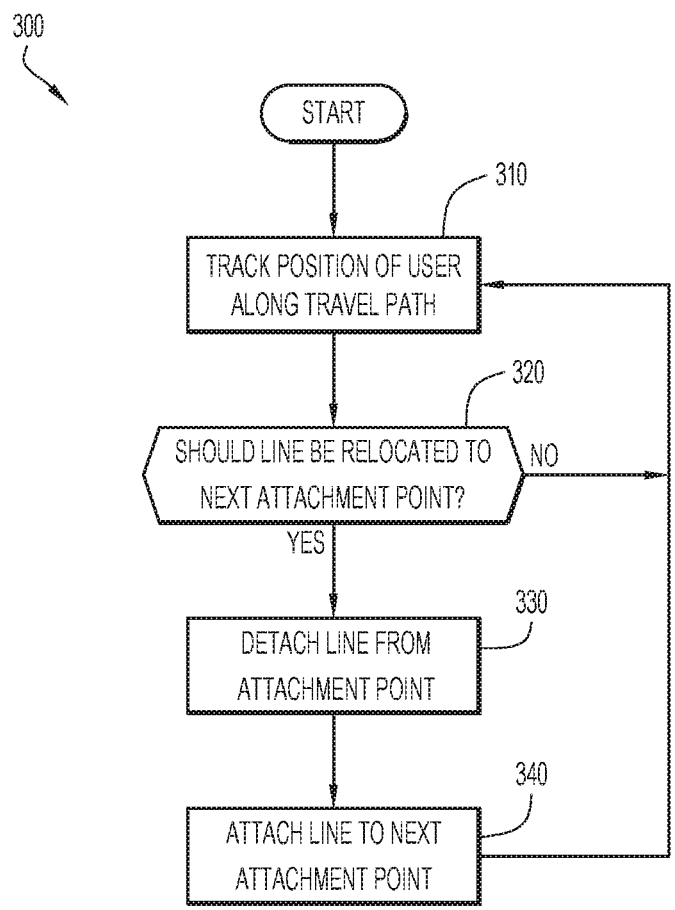
FIG. 3 is a flow chart depicting a method of providing assistance to a user traversing a structure in accordance with an embodiment of the present invention.

FIG. 3 is a flow chart depicting a method 300 of providing assistance to a user traversing a structure in accordance with an embodiment of the present invention.

The position of a user along a travel path is tracked at operation 310. Safety device 205 may track a user's position by analyzing data collected by sensor assembly 260, line sensor 295, and/or location module 280 using tracking module 230. Thus, a user's position may be tracked by one or more of image processing, acoustic location, and/or location of client device 275.

Operation 320 determines if a line should be relocated to a next attachment point. Tracking module 230 may determine that a user is positioned beyond a threshold distance from an attachment point to which a line is attached. Additionally or alternatively, tracking module 230 may determine that a line should be relocated based on strain or pressure in the line that is detected by line sensor 295. If operation 320 determines that a line should be relocated, the line is detached from its attachment point at operation 330. Otherwise, method 300 returns to operation 310 to continue tracking the position of the user along the travel path.

A line is detached from an attachment point at operation 330. Motion module 235 may position safety device 205 near the attachment point, and coupling module 240 may position arm 255 such that coupling mechanism 245 can interact with the attachment point and carabiner 125. Coupling module 240 may then perform image processing to instruct coupling mechanism 245 to detach the carabiner from the attachment point. In particular, coupling mechanism 245 may align with carabiner 125, attract carabiner 125 using an electromagnetic unit, and open the gate of carabiner 125 using a side lock arm. The process of detaching a line is depicted and described in further detail with respect to FIGS. 4-6.

The line is attached to a new attachment point at operation 340. Tracking module 230 may select an unused attachment point (e.g., an attachment point with no line currently attached) that is farther along a user's travel path in the user's direction of travel, and closer to the user than the previous attachment point from which the line was detached at operation 330. Thus, attaching the line to the new attachment point will safeguard a user from a fall while providing shorter runout than the previous attachment point. Once an attachment point is selected, coupling mechanism may be positioned next to the attachment point, and carabiner 125 may be released, thereby attaching the line. After the line is attached, method 300 may return to operation 310 and continue tracking position of the user along the travel path. In some embodiments, method 300 may be performed simultaneously by two or more safety devices 205, which each provide assistance to a user.

Figure 4:
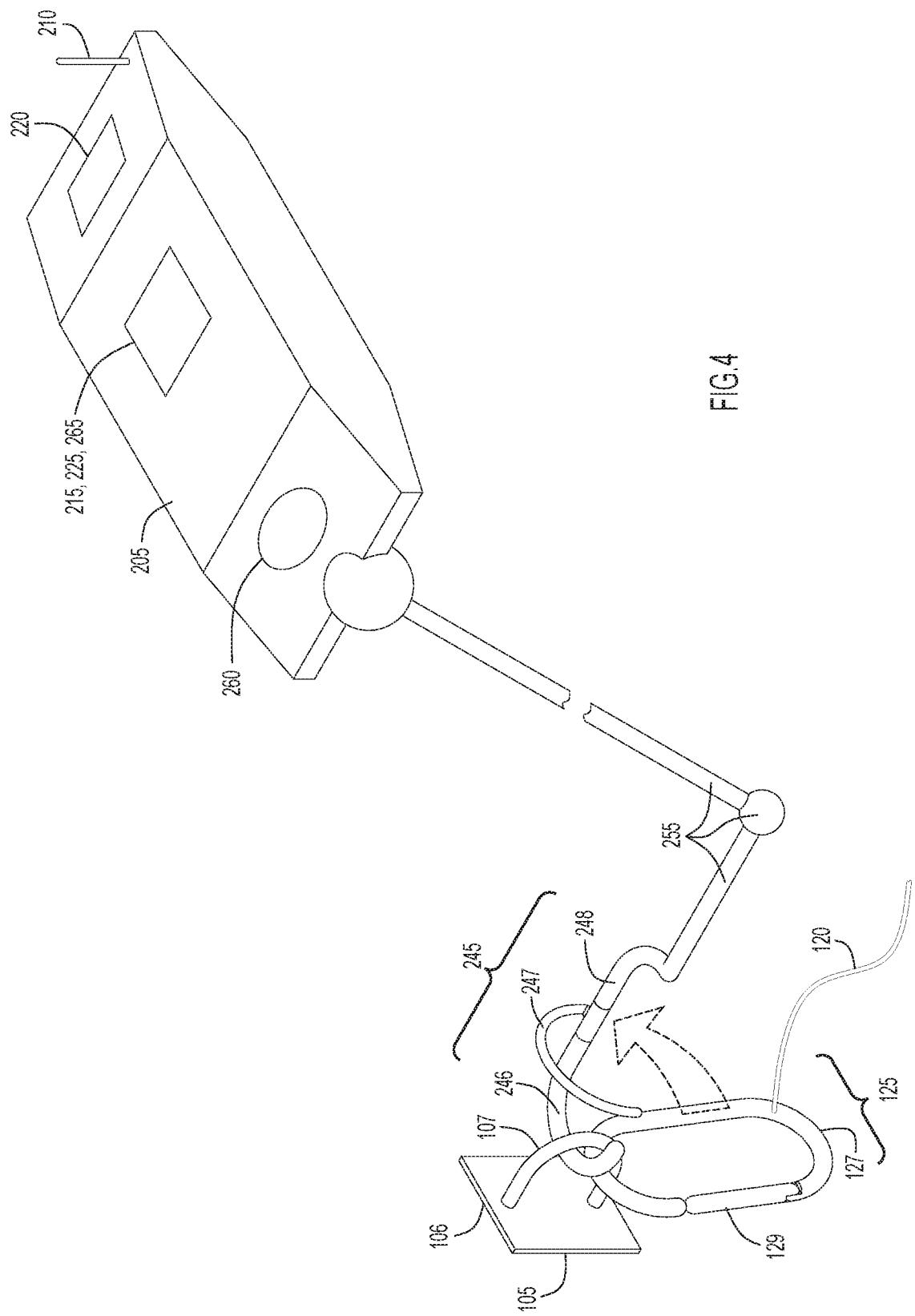
FIG. 4 is a diagram depicting a safety device detaching a line from an attachment point in accordance with an embodiment of the present invention.

FIG. 4 is a diagram depicting a safety device 205 detaching a line 120 from an attachment point 105 in accordance with an embodiment of the present invention. As depicted, safety device 205 includes a network interface 210, a processor 215, a power source 220, memory 225, coupling mechanism 245, motion assembly 250 (e.g., rotors or wheels), arm 255, and sensor assembly 260. Coupling mechanism 245 includes hook 246, side lock arm 247, and electromagnetic unit 248. Carabiner 125 includes body 127 and gate 129. Gate 129 of carabiner 125 may be spring-loaded such that gate 129 remains shut unless a threshold force is imparted on gate 129. At least some portion of body 127 of carabiner 125 may include a material that is attracted to a magnetic field. Line 120 is attached to attachment point 105 via carabiner 125.

Once safety device 205 is positioned within reach of attachment point 105, arm 255 may be manipulated such that coupling mechanism 245 is near attachment point 105 and carabiner 125. Using image processing, arm 255 may be positioned such that hook 246 is hooked around the loop 107 of attachment point 105, and electromagnetic unit 248 may be activated to attract carabiner 125 toward coupling mechanism 245.

Figure 5:
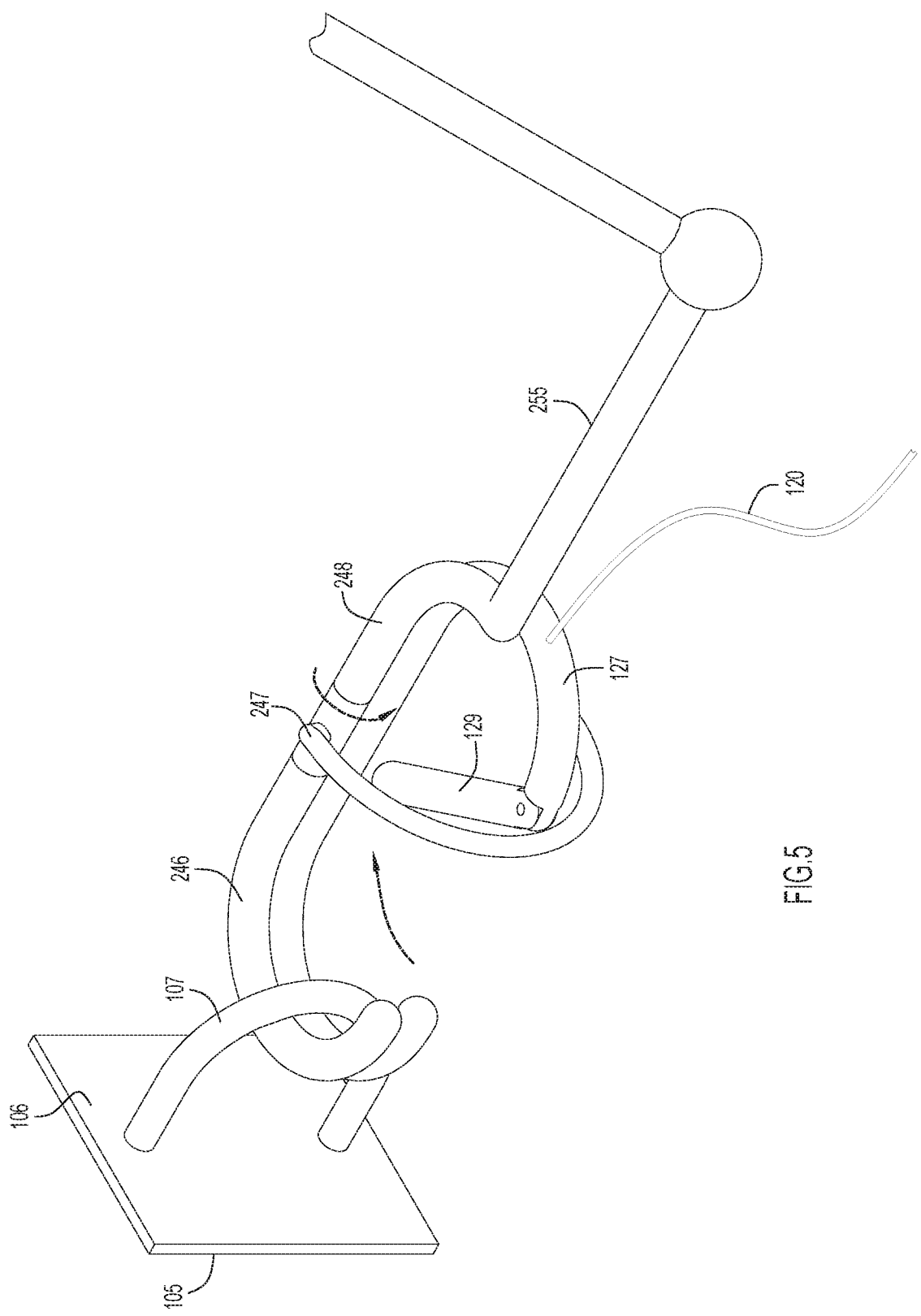
FIG. 5 is a diagram depicting a coupling mechanism detaching a line from an attachment point in accordance with an embodiment of the present invention.

FIG. 5 is a diagram depicting a coupling mechanism 245 detaching a line 120 from an attachment point 105 in accordance with an embodiment of the present invention. As depicted, electromagnetic unit 248 has been activated to draw body 127 of carabiner 125 toward coupling mechanism 245. Once carabiner 125 and coupling mechanism 245 are aligned, side lock arm 247 may rotate to apply a threshold force to gate 129, pulling gate 129 of carabiner 125 open and allowing for carabiner 125 to be unhooked from the loop 107 of attachment point 105 at the same time that hook 246 of coupling mechanism 245 is unhooked. A line may similarly be attached to a next attachment point by hooking the combined carabiner 125 and coupling mechanism 245 around the loop 107 of the attachment point and releasing side lock arm 247 to close gate 129. Once gate 129 closes, electromagnetic unit 248 may be deactivated, and arm 255 may be retracted to remove coupling mechanism 245 from the attachment point.

Figure 6:
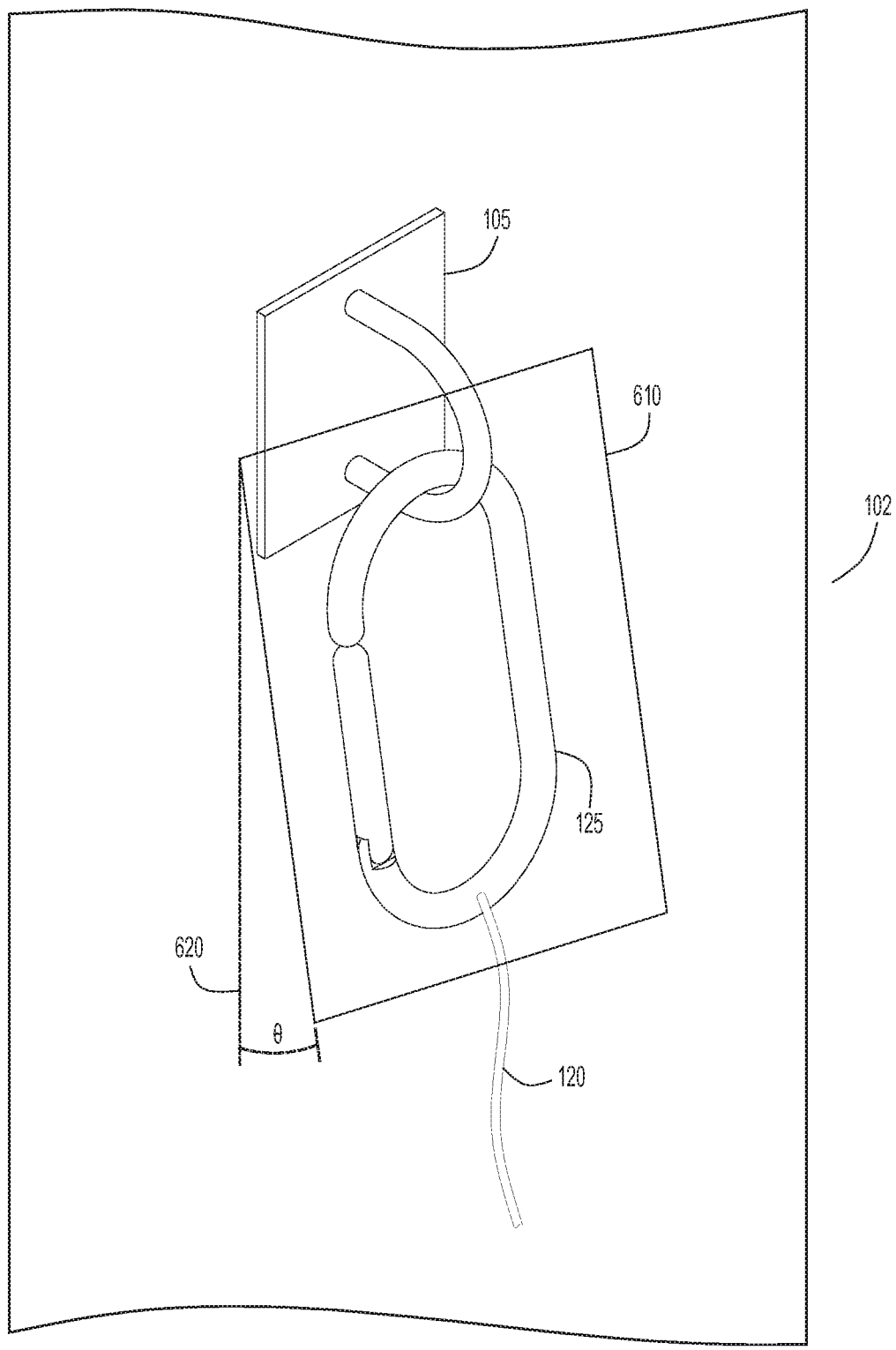
FIG. 6 is a diagram depicting an image processing technique in accordance with an embodiment of the present invention.

FIG. 6 is a diagram depicting an image processing technique in accordance with an embodiment of the present invention. As depicted, an image including attachment point 105, carabiner 125, and line 120 may be captured by sensor assembly 260 of safety device 205 and processed via coupling module 240. Coupling module 240 may draw a box 610 around carabiner 125 using known or other image processing techniques, and an angle 620, θ, may be determined between box 610 and the surface of structure 102. Coupling module 240 may position arm 255, and therefore, coupling mechanism 245, based on angle 620, ensuring that coupling mechanism 245 can be properly lined up with carabiner 125 for detachment.

Figure 7:
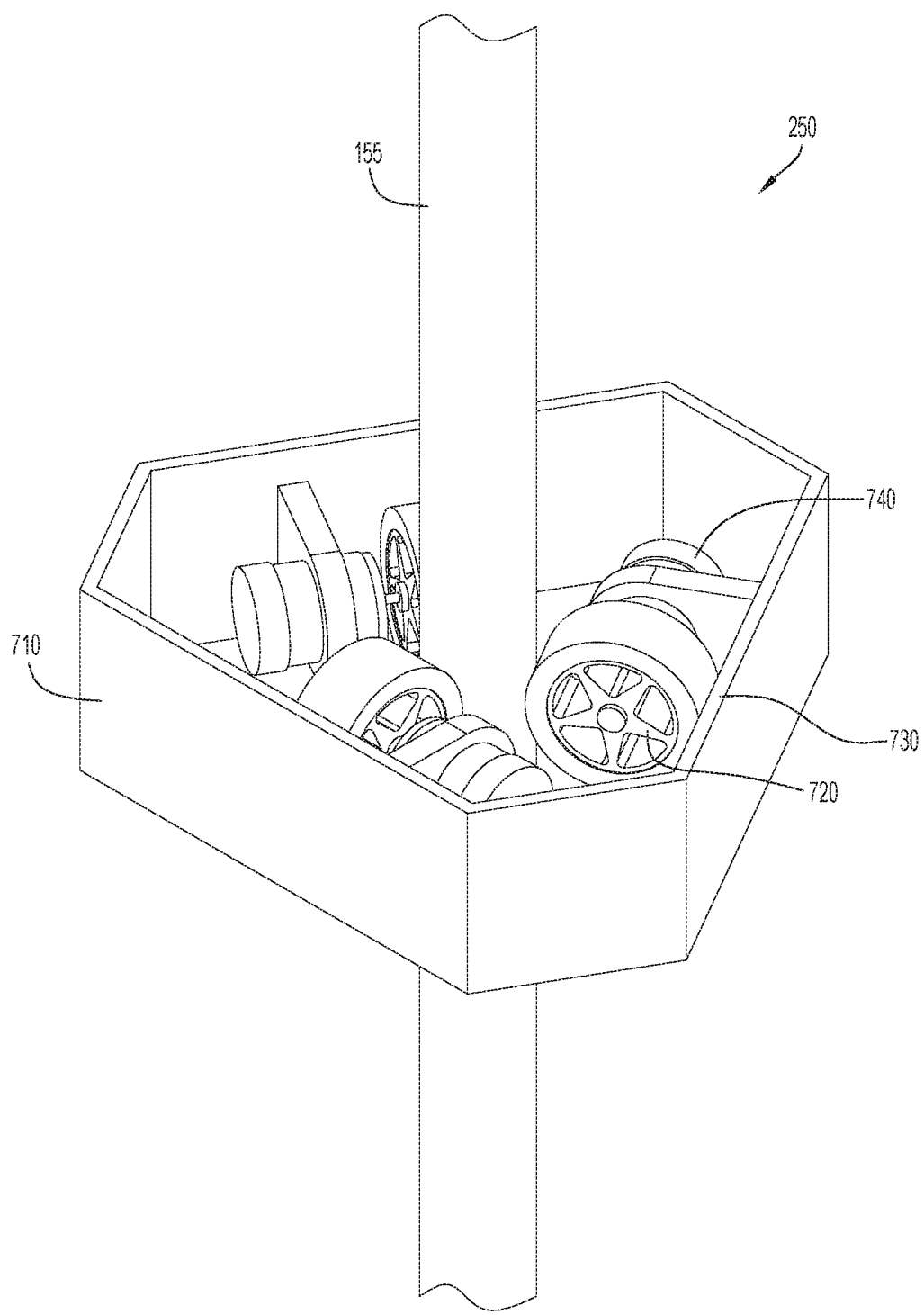
FIG. 7 is a diagram depicting a motion assembly for a safety device in accordance with an embodiment of the present invention.

FIG. 7 is a diagram depicting a motion assembly 250 for a safety device 205 in accordance with an embodiment of the present invention. Motion assembly 250 may provide motion to embodiments in which safety device 205 is affixed to a support rather than an aerial device. As depicted, motion assembly 250 is attached to safety device support 155 and includes body 710, at least one wheel 720, at least one brake 730, and a motor 740.

Motion assembly 250 may move along safety device support 155 using wheel 720, and may remain stationary by applying brake 730. Wheel 720 may be rotated by a driveshaft that is powered by motor 740. In some embodiments, motor 740 is an electric motor that draws power from power source 220. Motion module 235 may instruct motion assembly 250 to move safety device 205 by applying force to wheel 720 in one direction while brake 730 is not applied. When safety device 205 arrives at a desired position, motion module 235 may instruct motor 740 to deactivate, and may activate brake 730. Motion assembly 250 may thus enable safety device 205B to attach and detach lines as depicted and described above.

FIG. 8 is a block diagram depicting components of a computer 10 suitable for executing the methods disclosed herein. Computer 10 may be used with safety device 205 and/or client device 270 in accordance with embodiments of the present invention. It should be appreciated that FIG. 8 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to assisting a user to traverse a structure (e.g., information collected by sensor assembly 260, user travel path information, instructions for coupling mechanism 245 and motion assembly 250, strain data, pressure data, user preferences, etc.) may be stored within any conventional or other data structures (e.g., files, arrays, lists, stacks, queues, records, etc.) and may be stored in any desired storage unit (e.g., database, data or other repositories, queue, etc.). The data transmitted between safety device 205, line sensor 295, and/or client device 275 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to assisting a user to traverse a structure (e.g., information collected by sensor assembly 260, user travel path information, instructions for coupling mechanism 245 and motion assembly 250, strain data, pressure data, user preferences, etc.) may include any information provided to, or generated by, safety device 205, line sensor 295, and/or client device 275. Data relating to assisting a user to traverse a structure may include any desired format and arrangement, and may include any quantity of any types of fields of any size to store any desired data. The data relating to assisting a user to traverse a structure may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to assisting a user to traverse a structure), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of implementing a safety device for assisting a user to traverse a structure.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., server software, networking software, tracking module 230, motion module 235, coupling module 240, control module 290, etc.). These systems may include any types of monitors and input devices (e.g., keyboard, mouse, voice recognition, etc.) to enter and/or view information.

It is to be understood that the software (e.g., server software, networking software, tracking module 230, motion module 235, coupling module 240, control module 290, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, server systems, safety devices, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., server software, networking software, tracking module 230, motion module 235, coupling module 240, control module 290, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to assisting a user to traverse a structure). The database system may be implemented by any number of any conventional or other databases, data stores or storage structures (e.g., files, databases, data structures, data or other repositories, etc.) to store information (e.g., data relating to assisting a user to traverse a structure). The database system may be included within or coupled to the server and/or client systems. The database systems and/or storage structures may be remote from or local to the computer or other processing systems, and may store any desired data (e.g., data relating to assisting a user to traverse a structure).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A system for assisting a user to traverse a structure comprising:
    a safety device comprising:
        a sensor assembly to detect positions of a user along a travel path for a structure, wherein the travel path includes a plurality of attachment points to secure the user to the structure via one or more lines;
        a motion assembly to move the safety device along the travel path based on the detected positions of the user, wherein the motion assembly maintains a threshold distance from the user; and
        a coupling mechanism to couple the one or more lines to one or more of the attachment points encountered along the travel path.

2. The system of claim 1, wherein the structure includes one of an earthen structure, a building, a tower, and a pole.

3. The system of claim 1, wherein the motion assembly moves the safety device along a surface of the structure.

4. The system of claim 3, wherein the sensor assembly includes one or more from a group of: a strain gauge, a pressure sensor, an optical sensor, an auditory sensor, and an image capture device.

5. The system of claim 4, further comprising a processor configured to:
    perform image processing on images from the image capture device to detect progress of the user and estimate risk of a fall.

6. The system of claim 1, further comprising:
    a communication system to communicate with the user and receive instructions to adjust operations pertaining to one or more from a group of: mode of operation, the attachment points, and the travel path.

7. The system of claim 1, wherein the threshold distance provides an amount of slack in the one or more lines indicated by the user.

8. The system of claim 1, wherein the safety device includes an aerial device.

9. The system of claim 8, wherein the coupling mechanism further comprises:
    a transfer mechanism to transfer a line from a current attachment point to a next attachment point of the travel path in response to the sensor assembly detecting the user approaching the current attachment point within a predetermined distance.

10. The system of claim 9, wherein the one or more lines include a plurality of lines, and the transfer mechanism further transfers the line from the current attachment point to the next attachment point of the travel path while at least one other line engages an attachment point.

11. The system of claim 8, further comprising a plurality of safety devices.

12. A method for assisting a user to traverse a structure comprising:
    detecting, with a sensor assembly of a safety device, positions of a user along a travel path for a structure, wherein the travel path includes a plurality of attachment points to secure the user to the structure via one or more lines;

moving, using a motion assembly, the safety device along the travel path based on the detected positions of the user, wherein the motion assembly maintains a threshold distance from the user; and coupling, using a coupling mechanism, the one or more lines to one or more of the attachment points encountered along the travel path.

13. The method of claim 12, further comprising: moving, using the motion assembly, the safety device along a surface of the structure.

14. The method of claim 12, wherein the sensor assembly includes one or more from a group of: a strain gauge, a pressure sensor, an optical sensor, an auditory sensor, and an image capture device.

15. The method of claim 14, further comprising: performing, via a processor, image processing on images from the image capture device to detect progress of the user and estimate risk of a fall.

16. The method of claim 12, wherein the safety device includes an aerial device.

17. A computer program product for assisting a user to traverse a structure, the computer program product comprising a computer readable storage medium having program instructions embodied therewith, the program instructions executable by a computer to cause the computer to:

analyze data collected with a sensor assembly of a safety device to detect positions of a user along a travel path for a structure, wherein the travel path includes a plurality of attachment points to secure the user to the structure via one or more lines;

control a motion assembly to move the safety device along the travel path based on the detected positions of the user, wherein the motion assembly maintains a threshold distance from the user; and control a coupling mechanism to couple the one or more lines to one or more of the attachment points encountered along the travel path.

18. The computer program product of claim 17, further comprising instructions to cause the safety device to move or fly, using the motion assembly, along a surface of the structure.

19. The computer program product of claim 17, wherein the sensor assembly includes one or more from a group of: a strain gauge, a pressure sensor, an optical sensor, an auditory sensor, and an image capture device.

20. The computer program product of claim 19, further comprising instructions to perform image processing on images from the image capture device to detect progress of the user and estimate risk of a fall.

* * * * *